Sept. 1, 1953      L. W. ROOK      2,650,566
POULTRY FEEDER
Filed Jan. 24, 1950      2 Sheets-Sheet 1
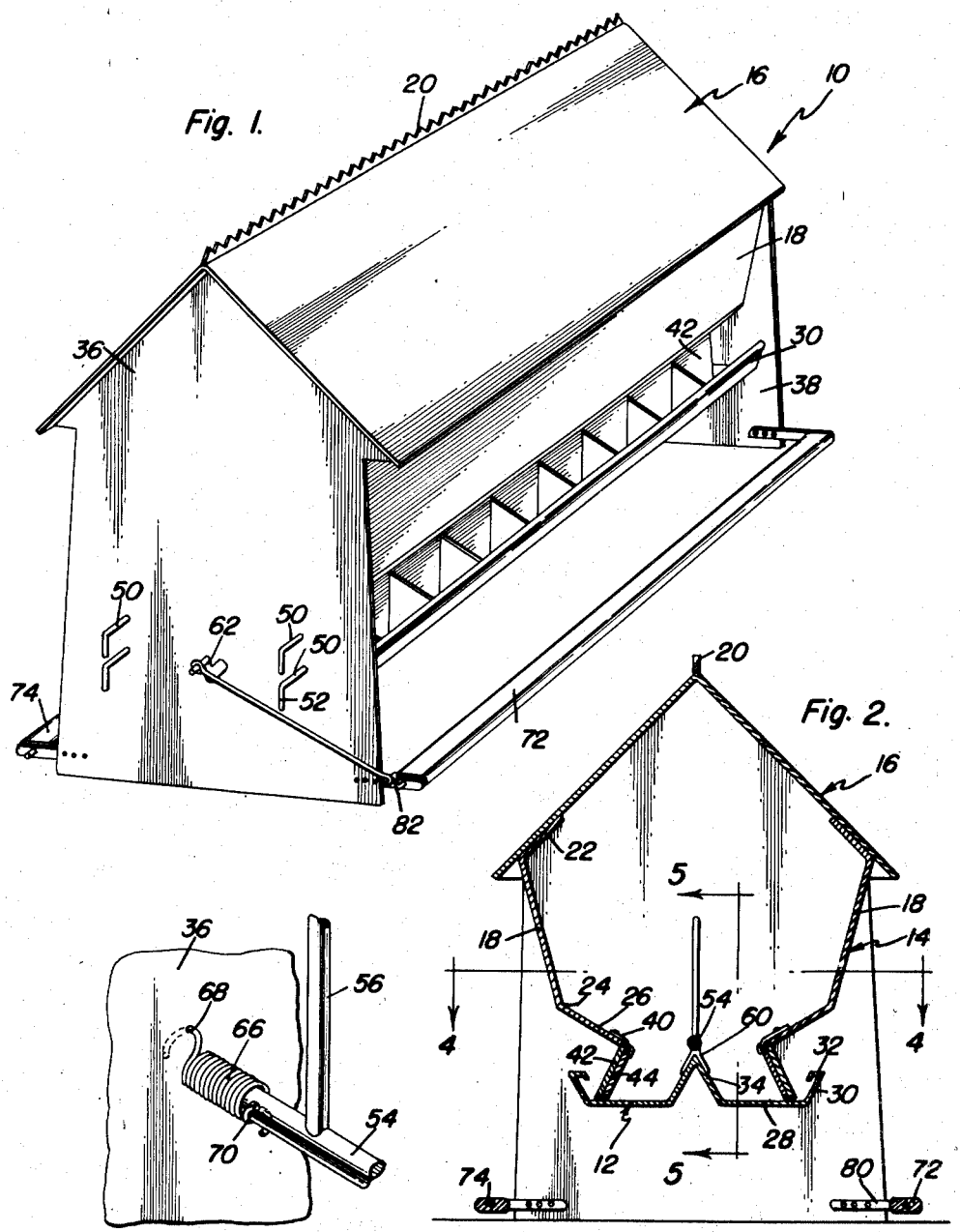
Louis W. Rook
INVENTOR.

Sept. 1, 1953 L. W. ROOK 2,650,566
POULTRY FEEDER
Filed Jan. 24, 1950 2 Sheets-Sheet 2

Louis W. Rook
INVENTOR.

BY

Patented Sept. 1, 1953

2,650,566

UNITED STATES PATENT OFFICE 2,650,566

POULTRY FEEDER

Louis W. Rook, Catarina, Tex.

Application January 24, 1950, Serial No. 140,253

3 Claims. (Cl. 119—53.5)

1

This invention relates to new and useful improvements in animal feeders, and more particularly pertains to a feeder having a feed hopper and a feed agitator, the actuation of which is responsive to animals feeding therefrom.

The primary object of this invention is to dispense feed from a source of supply to a position lending access thereto by poultry or the like.

Another object of this invention is to provide a device of this character, in which the dispensing of the feed may be controlled and the mass of feed is agitated to ensure feed being dispensed therefrom and to prevent caking of the same.

Another object of this invention is to provide a device of this character, in which advantage may be taken of the natural propensities of poultry or the like to agitate the feed in the feed hopper.

Another object of this invention is to provide a device capable of realizing the foregoing objects, which will be sanitary and secure against contamination of the feed by animal droppings or the like.

A meritorious feature of the present invention resides in the agitator and the perches being rockably mounted and the connecting means therebetween, whereby rocking of the perches by poultry actuates rocking movement of the agitator in the feed hopper.

Another feature of the invention resides in the details of construction of the hopper and the trough, whereby the feed coming from the hopper is divided into two streams, and the position of the agitator being such as to prevent jamming or bridging of the feed stream division.

Still another feature of the present invention resides in the means controlling the size of the openings communicating with the interior of the hopper.

A final important feature to be specifically enumerated herein resides in the agitator and the means for mounting the same together with the provision of means normally resiliently retaining the agitator in a neutral position.

These, together with various ancillary features and objects of the invention which will later become apparent as the following description proceeds, are attained by the present invention, a preferred embodiment of which has been illustrated by way of example only in the accompanying drawings, wherein:

Figure 1 is a perspective view of the poultry feeder;

Figure 2 is a vertical transverse sectional view of the poultry feeder taken substantially midway between the ends thereof.

Figure 3 is an enlarged fragmentary perspective view of the means provided for normally resiliently retaining the agitator in the neutral position;

Figure 4:
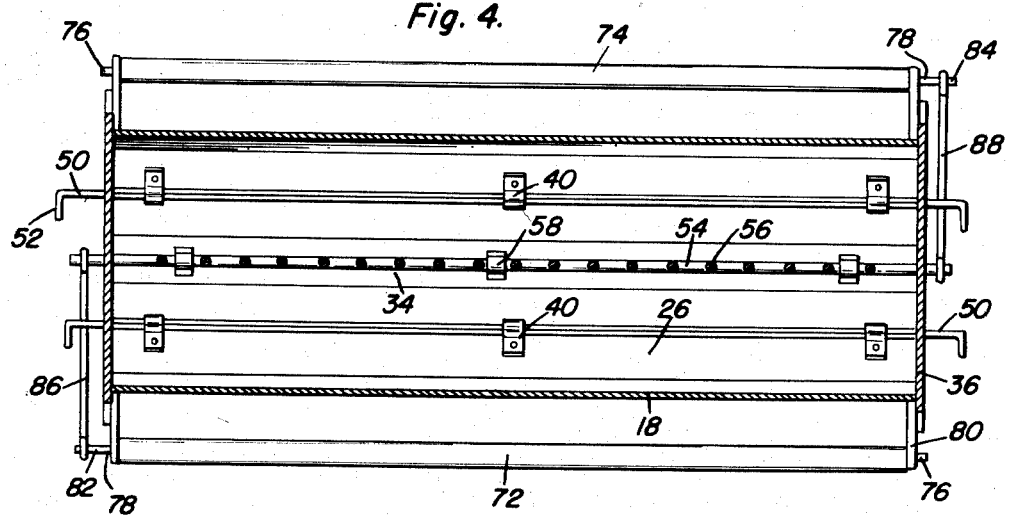
Figure 4 is a horizontal sectional view of the poultry feeder, being taken substantially upon the plane of the section line 4—4 of Figure 2.

Reference is now made more specifically to the accompanying drawings, wherein like numerals designate like parts throughout the various views, and in which the poultry feeder is designated generally by the numeral 10.

As best shown in Figures 1 and 2, the feeder 10 comprises a trough 12, a hopper 14, and a removable roof or cover 16 for the hopper 14.

The hopper 14 includes a pair of side walls 18, which adjacent their upper ends converge upwardly in spaced relation to support the ridged roof 16, to the latter of which along the ridge thereof is secured a toothed strip 20 for preventing poultry perching upon the roof 16. The lower edges of the roof 16 project outwardly from the side walls 18 and constitute protecting eaves for the hopper 14 and the trough 12.

Below the upwardly converging portions 22 of the side walls in engagement with the roof 16, the side walls 18 converge downwardly, being bent as at 24 to provide portions 26 which are more abruptly convergent adjacent the lower edge of the side walls 18.

The lower edges of the portions 26 are spaced so that the bottom of the hopper 14 is open, and the trough 12 is disposed directly beneath the open bottom of the hopper 14, which trough 12 includes a bottom wall 28 and upwardly and outwardly sloping side walls 30 the upper edges of which are inturned as at 32 for a purpose to presently appear. Longitudinally of the trough 12, the bottom wall 28 thereof is bent upwardly to form an inverted V-shaped ridge 34 that extends upwardly towards the open bottom of the hopper 14, so as to divide feed, not shown, descending from the hopper 14 into separate streams directed towards the trough side walls 30.

The ends of the trough 12 and the hopper 14 are closed by plates or end walls 36 which are suitably attached thereto, and which extend downwardly, as at 38, to support both the trough 12 and the hopper 14 as well as the roof 16.

Secured to the lower edge of the portions 26, by means of bracket arms 40 are strips 42 and 44 with the strip 44 being longitudinally slidable and in sliding engagement with the strip 42. The strips 42 and 44 are downwardly and outwardly divergent and are each provided with a plurality of spaced, inverted V-shaped openings 46 which may be adjustaby placed in registry upon longitudinal sliding movement of the strips 44. The upper and lower edges of the strips 42 and 44 are reinforced by rods 48 and 50 respectively, the rods 50 of the strip 44 extending longitudinally from the ends of the strip 44 through suitable apertures in the end walls 36 and are bent adjacent their opposite extremities to form handles 52 for longitudinal sliding adjustment of the strips 44 for adjusting the size of the registry of openings 46.

Figure 5:
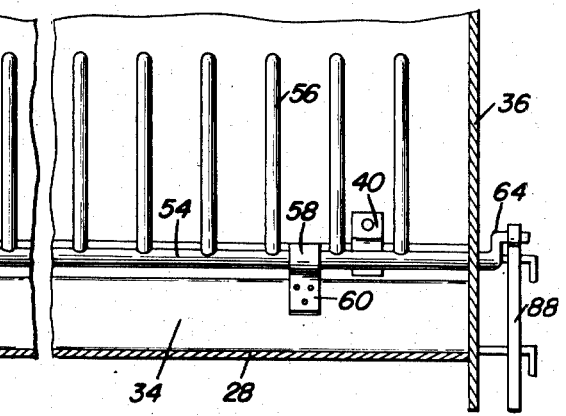
Figure 5 is an enlarged broken vertical, longitudinal sectional view taken substantially upon the plane of the section line 5—5 of Figure 2; and, Figure 6 is an enlarged fragmentary perspective view partially in section of a means provided for controlling the communication with the interior of the feed hopper.
Figure 6:
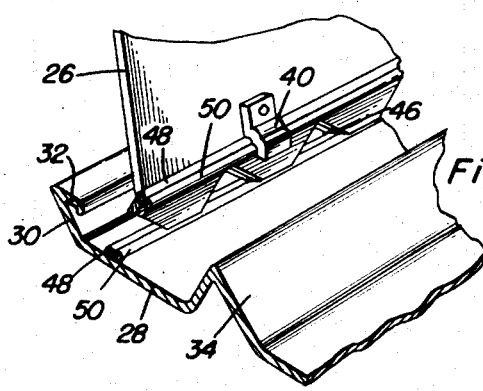

Means is provided to agitate the contents of the feed hopper 14, which includes a rock shaft 54 and spaced laterally extending agitator fingers 56 carried by the rock shaft 54. The rock shaft 54 extends longitudinally of the trough 12, and is suitably mounted for rocking about a longitudinal axis in bearings 58 that are suitably secured to the ridged portion 34 of the trough 12 by V-shaped brackets 60, as best shown in Figures 2 and 5. The rock shaft 54 is journalled through suitable apertures in the end walls 36, and at its opposite ends is provided with cranks 62 and 64 for rocking the same. A coil torsion spring 66 embraces the rock shaft 54 adjacent one end thereof, having one end suitably secured to the adjacent end wall 36 and the other end suitably secured to the rock shaft 54 as by extending through openings 68 and 70 in the end wall 36 and rock shaft 54 respectively, the arrangement being such that the fingers 56 are normally yieldingly retained in a vertical position extending upwardly into the hopper 14.

Means is provided to rock the rock shaft 54 responsive to movements of poultry feeding from the trough 12, which includes perch rails 72 and 74 which are rockably mounted upon opposite sides of the feeder 10 by means of pins 76 and 78 extending from opposite ends of the perch rails and which are rotatable in suitable apertures provided in support brackets 80 attached to the end walls 36. The pins 78 are bent to form cranks 82 and are connected by pitmans 86 and 88 to the cranks 62 and 64 respectively of the rock shaft 54. As thus far described it will be readily apparent that rocking motion of either of the perch rails will be communicated through a pitman to the rock shaft 54 to oscillate the fingers 56 within the hopper 14. Although the spring 66 will be normally sufficient to prevent such rotation of the rock shaft 54 as to allow a complete revolution of the perch rails 72 and 74, in the preferred construction the crank throw of the cranks carried by the perch rails will be relatively greater than the crank throw of the cranks carried by the rock shaft 54 to prevent such an occurrence.

It will thus be seen that poultry perched upon the perch rails will find their footing sufficiently precarious, due to the rockable mounting of the perch rails, that in their efforts to be secure thereon will cause the perch rails to rock and consequently the fingers 56 to agitate the feed within the hopper 14 to ensure its delivery to the trough 12. It will be noted that the rocking motion of the perch rail is greatly intensified when the number of poultry perched thereon is increased, due to their individual efforts to compensate for the movements of the others, and that the movements of the perch rails is all the more unpredictable when poultry is perched on both of the rails, inasmuch as poultry disposed upon the opposite rails are concealed from each other and since the motion of either rail is communicated through the pitmans and the rock shaft to the other rail.

It will be further noted that the inclination of the strips 42 and 44 permits poultry to readily feed through the openings 46 and that the side walls 30 and the inturned edges 32 prevent wastage of feed dropped by the poultry, while the shape of the side walls 18 prevent poultry from becoming so positioned as to drop excrements into the trough 12 so as to keep the same clean and free from contamination.

It will thus be seen that there has been provided a poultry feeder which will minimize the three primary sources of loss to poultrymen, namely, disease, wastage of feed, and failure of poultry to eat sufficient amounts of proper feed. Disease from feeding is avoided by the construction of the feeder preventing contamination of feed by not permitting scratching in the trough or droppings falling into the trough. Wastage of feed is avoided by the construction of the feeder openings not permitting poultry to throw feed with their beaks and the trough catching feed that falls from the beaks. Finally deterioration of feed by air to cause the same to become unpalatable as is the case with prepared feeds in which the grain forming the same has been cracked or ground. It will be noted that the feed is entirely enclosed within the hopper, except for only that portion of the same that is exposed by the poultry as it feeds bite by bite. The bite by bite exposure of fresh feed stimulates the appetite of poultry for rapid growth and also prevents selection of choice morsels to the exclusion of minerals and other growth promoting and egg producing factors included in prepared feeds, whereby the poultry is directly benefited and the poultryman likewise profits.

From the foregoing, the construction and operation of the device will be readily understood and further explanation is believed to be unnecessary. However, since numerous modifications and changes will readily occur to those skilled in the art after a consideration of the foregoing specification and accompanying drawings, it is not desired to limit the invention to the exact construction shown and described, but all suitable modifications and equivalents may be resorted to, falling within the scope of the appended claims.

Having described the invention, what is claimed as new is:

1. A poultry feeder comprising a trough and a hopper arranged to discharge into said trough, an agitator in the hopper, and means adapted to be actuated by feeding poultry for actuating the agitator, said means including a pair of spaced perch support members fixed with respect to the hopper, an elongated perch extending between the members, said perch having oppositely extending pins at its opposite ends that are disposed substantially along the central axis of the perch, said members having aligned apertures rotatably receiving said pins, one of said pins projecting through one of the members and being formed with an offset portion to constitute a crank for the perch, and a pitman operatively connecting the crank to the agitator.

2. A poultry feeder comprising a hopper having an open bottom and downwardly and inwardly inclined side walls, a trough disposed below said hopper and having side walls and a bottom wall, said hopper side walls extending into the trough in spaced relation to the side walls of the trough and resting on the bottom walls of the trough, end plates closing the ends of said trough and hopper, said bottom wall including an inverted, central, V-shaped ridge portion extending upwardly into the open bottom of the hopper for dividing the flow of feed from the trough toward the trough side walls, a feed agitator comprising a rock shaft having a plurality of spaced, vertically extending fingers, said shaft being rotatably mounted upon the apex of the ridge portion, and further dividing the flow of feed from the hopper, and perches on opposite sides of said trough and secured to said end plates, said perches being operatively connected to said agitator for rocking said rock shaft, said perches serving as feeding platforms for the poultry.

3. The combination of claim 2, wherein said hopper side walls have notched openings therein adjacent the trough bottom wall, strips slidably mounted on said hopper side walls and having openings in registry with said notched openings whereby the amount of feed flowing through the notched openings can be controlled by sliding movement of said strips.

LOUIS W. ROOK.

References Cited in the file of this patent

UNITED STATES PATENTS

| Number | Name | Date |
| --- | --- | --- |
| 1,283,464 | Brown et al. | Nov. 5, 1918 |
| 1,530,101 | Ashing | Mar. 17, 1925 |
| 1,610,220 | Olson | Dec. 7, 1926 |
| 1,812,166 | Palmer | June 30, 1931 |
| 1,881,820 | McCollough et al. | Oct. 11, 1932 |
| 2,357,698 | Stafford | Sept. 5, 1944 |
| 2,363,212 | Wagner | Nov. 21, 1944 |
| 2,475,070 | Wood | July 5, 1949 |
| 2,539,348 | Gass | Jan. 23, 1951 |